United States Patent
Chang et al.

(10) Patent No.: US 9,760,184 B2
(45) Date of Patent: Sep. 12, 2017

(54) PORTABLE KEYBOARD AND SPEAKER ASSEMBLY

(71) Applicant: LG ELECTRONICS INC., Seoul (KR)

(72) Inventors: Hyuksoo Chang, Seoul (KR); Hyunsun Yoo, Seoul (KR); Sangwoo Seo, Seoul (KR); Hyungwoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/889,367

(22) PCT Filed: Apr. 9, 2014

(86) PCT No.: PCT/KR2014/003063
§ 371 (c)(1),
(2) Date: Nov. 5, 2015

(87) PCT Pub. No.: WO2015/080350
PCT Pub. Date: Jun. 4, 2015

(65) Prior Publication Data
US 2016/0098097 A1    Apr. 7, 2016

(30) Foreign Application Priority Data

Nov. 26, 2013 (KR) ........................ 10-2013-0144846
Feb. 27, 2014 (KR) ........................ 10-2014-0023582

(51) Int. Cl.
*G06F 3/02*  (2006.01)
*G06F 1/16*  (2006.01)

(52) U.S. Cl.
CPC .......... *G06F 3/0221* (2013.01); *G06F 1/1632* (2013.01); *G06F 3/021* (2013.01); *G06F 3/0219* (2013.01)

(58) Field of Classification Search
CPC ............................ G06F 1/1666; G06F 3/0221
See application file for complete search history.

(56) References Cited

U.S. PATENT DOCUMENTS

| | | | |
|---|---|---|---|
| 5,220,521 A * | 6/1993 | Kikinis | G06F 3/0221 361/679.1 |
| 6,265,993 B1 * | 7/2001 | Johnson | G06F 3/0202 341/20 |

(Continued)

FOREIGN PATENT DOCUMENTS

| | | |
|---|---|---|
| GB | 2461642 A | 1/2010 |
| KR | 10-2011-0109791 A | 10/2011 |
| KR | 10-2011-0136751 A | 12/2011 |

*Primary Examiner* — Patrick F Marinelli
(74) *Attorney, Agent, or Firm* — Birch, Stewart, Kolasch & Birch, LLP

(57) ABSTRACT

A portable keyboard includes: a polygonal pillar-shaped main body having a battery embedded therein; a key assembly connected to the main body, the key assembly having a plurality of key arrangements; and a connecting member formed to extend down to the bottom of the key assembly while connecting the key assembly and the main body to each other, wherein at least one key arrangement in the key assembly allows information to be entered by a touch, a first element is provided to the main body, a second element is provided to the key assembly, and the first element and the second element are attached to each other by magnetic force such that the key assembly is wound.

18 Claims, 16 Drawing Sheets

(56) References Cited

U.S. PATENT DOCUMENTS

| | | | | |
|---|---|---|---|---|
| 6,585,435 B2* | 7/2003 | Fang | H01H 13/702 | 341/22 |
| 6,867,712 B2* | 3/2005 | Tai | G06F 3/0221 | 341/22 |
| 6,967,831 B2* | 11/2005 | Chuang | G06F 3/0221 | 361/679.15 |
| 7,356,361 B1* | 4/2008 | Hawkins | G06F 1/1616 | 379/368 |
| 7,428,142 B1* | 9/2008 | Ligtenberg | G06F 1/1616 | 345/157 |
| 7,667,962 B2* | 2/2010 | Mullen | G06F 1/1624 | 359/461 |
| 7,782,230 B2* | 8/2010 | Olodort | G06F 1/1613 | 200/600 |
| 8,130,122 B2* | 3/2012 | Tseng | G06F 3/0221 | 341/22 |
| 8,471,818 B2* | 6/2013 | Wu | G06F 3/0221 | 345/168 |
| 8,511,920 B2* | 8/2013 | Wu | G06F 3/041 | 341/22 |
| 8,576,555 B2* | 11/2013 | Misawa | G02F 1/133305 | 345/156 |
| 8,757,908 B2* | 6/2014 | Wu | G06F 3/0221 | 345/1.3 |
| 8,982,543 B2* | 3/2015 | Wang | G06F 3/0202 | 361/679.11 |
| 9,019,694 B2* | 4/2015 | Lee | G06F 3/0221 | 248/229.22 |
| D740,821 S * | 10/2015 | Kim | D14/391 | |
| 9,244,494 B2* | 1/2016 | Hinson | G06F 15/025 | |
| D750,080 S * | 2/2016 | Lee | D14/392 | |
| 9,250,708 B2* | 2/2016 | Natarajan | G06F 3/0221 | |
| D750,628 S * | 3/2016 | Lee | D14/392 | |
| 9,383,836 B2* | 7/2016 | Natarajan | G06F 3/0221 | |
| 9,411,381 B2* | 8/2016 | Lee | G06F 3/0221 | |
| 2003/0044216 A1* | 3/2003 | Fang | H01H 13/702 | 400/491 |
| 2003/0048256 A1* | 3/2003 | Salmon | G06F 1/1613 | 345/168 |
| 2003/0128502 A1* | 7/2003 | Chuang | G06F 3/0221 | 361/679.15 |
| 2003/0227396 A1* | 12/2003 | Chen | G06F 3/0221 | 341/22 |
| 2006/0061555 A1* | 3/2006 | Mullen | G06F 1/1624 | 345/169 |
| 2006/0284742 A1* | 12/2006 | Olodort | G06F 1/1613 | 341/22 |
| 2008/0253822 A1* | 10/2008 | Matias | G06F 3/0221 | 400/472 |
| 2009/0016003 A1* | 1/2009 | Ligtenberg | G06F 1/1616 | 361/679.26 |
| 2009/0250328 A1* | 10/2009 | Tseng | G06F 3/0221 | 200/5 A |
| 2011/0227822 A1* | 9/2011 | Shai | G06F 1/1615 | 345/156 |
| 2011/0304562 A1* | 12/2011 | Wu | G06F 3/03547 | 345/173 |
| 2011/0305493 A1* | 12/2011 | Wu | G06F 3/041 | 400/472 |
| 2011/0311289 A1* | 12/2011 | Wu | G06F 3/0221 | 400/472 |
| 2012/0009000 A1 | 1/2012 | Starrett | | |
| 2012/0019401 A1* | 1/2012 | Wu | G06F 3/0221 | 341/22 |
| 2012/0328349 A1 | 12/2012 | Isaac et al. | | |
| 2013/0107438 A1* | 5/2013 | Lee | G06F 3/0221 | 361/679.08 |
| 2013/0282932 A1 | 10/2013 | Robert et al. | | |
| 2013/0299326 A1* | 11/2013 | Hsu | H01H 13/76 | 200/5 A |
| 2014/0055937 A1* | 2/2014 | Wang | G06F 3/0202 | 361/679.17 |
| 2014/0139989 A1* | 5/2014 | Mori | G06F 1/1628 | 361/679.09 |
| 2014/0160025 A1* | 6/2014 | Natarajan | G06F 3/0221 | 345/168 |
| 2015/0198982 A1* | 7/2015 | Lee | G06F 3/0221 | 361/679.08 |
| 2015/0261264 A1* | 9/2015 | Brown | G06F 3/0221 | 345/174 |
| 2016/0098097 A1* | 4/2016 | Chang | G06F 3/0221 | 345/169 |
| 2016/0299531 A1* | 10/2016 | Vertegaal | G06F 1/1666 | |
| 2016/0320807 A1* | 11/2016 | Lee | G06F 3/0221 | |
| 2016/0334893 A1* | 11/2016 | Natarajan | G06F 3/0221 | |

* cited by examiner

PORTABLE KEYBOARD AND SPEAKER ASSEMBLY

TECHNICAL FIELD

The present invention relates to a portable keyboard and a speaker assembly, and more particularly, to a keyboard with enhanced portability that can be used wirelessly and a speaker assembly using this keyboard.

BACKGROUND ART

With the rapid development of the internet and multimedia, a variety of portable devices or multimedia products using the internet and multimedia are commercially available to meet users' needs. Such portable devices or multimedia products are getting smaller and more complex for most efficient use, making it portable enough to carry around, allowing the user to enter information as they wish, and organically combining different features.

These portable devices or multimedia products require a wireless keyboard or other input devices to enter text. However, such input devices as wireless keyboards are quite bulky and not easy to carry around.

Moreover, conventional portable keyboards are bulky and usually not foldable, so they are not that convenient when you are out and about. Also, these portable keyboards are not easy to set up because they are connected to other products by wires in most cases.

DISCLOSURE OF THE INVENTION

Therefore, an object of the present invention is to provide a portable keyboard with enhanced portability that can be rolled up like a scroll.

Another object of the present invention is to provide a portable device that makes it easy to set up a portable terminal on it.

An exemplary embodiment of the present invention provides a portable keyboard comprising: a polygonal pillar-shaped main body having a battery embedded therein; a key assembly connected to the main body, the key assembly having a plurality of key arrangements; and a connecting member formed to extend down to the bottom of the key assembly while connecting the key assembly and the main body to each other, wherein at least one key arrangement in the key assembly allows information to be entered by a touch, a first element is provided to the main body, a second element is provided to the key assembly, and the first element and the second element are attached to each other by magnetic force such that the key assembly is wound.

The connecting member may comprise: a pattern sheet having a printed circuit pattern formed therein; and a front sheet and a rear sheet, placed on the top and bottom of the pattern sheet to protect the pattern sheet.

The key assembly may have at least one mechanical key arrangement, the mechanical key arrangement may comprise a key placed on the top to be pressed by a user; a key support (dummy) placed underneath the key to support the key, the key support having a through-hole to pass the lower end of the key; and a dome formed on the pattern sheet.

The second element may be provided at the bottom of the key.

A separation preventing part having a larger diameter than the through-hole may be formed at the bottom end of the key.

The main body may comprise: a setup part having a pair of rotary members, wherein the rotary member may comprise a hinge part rotatable while fixed at the main body; a fitting part extending from the hinge part, the fitting part having a slot to fit a mobile terminal in; and a supporting part extending from the fitting part to restrain the mobile terminal.

The main body may comprise: a hinge fixing part recessed inward from the main body to provide a space where the hinge part is rotatable; a protruding part formed on one side of the hinge fixing part, the protruding part having the fitting part inserted and fitted thereinto; and a recessed part having the supporting part fitted therein, so that the exterior of the main body maintains a polygonal shape.

The first element or the second element may be made of a magnet or steel sheet.

A metal sheet may be further provided underneath the rear sheet.

The first element may be a magnet, and wherein the key assembly may comprise: a key pressed by a user; and an elastic member provided underneath the key to support the key, wherein the elastic member may be made of steel.

A light source may be formed on the pattern sheet so that light leaks around the key.

The first and second elements may be magnets, the first element may be covered with a yoke.

An internal battery supplying power to operate the keyboard and a printed circuit board connected to the internal battery may be provided inside the main body, and a charging IC chip may be formed on the printed circuit board.

In case that the key assembly comprises a plurality of hotkeys, different terminals may be allocated to the hotkeys, respectively, so that the hotkeys are paired with the corresponding terminals when pressed.

In case that the key assembly comprises a single hotkey, a predetermined order may be set up to allocate multiple terminals to the hotkey so that the hotkey is paired with the different terminals in the predetermined order when pressed.

A touchpad may be provided on the outer surface of the main body, to move a cursor or mouse arrow in the direction of a touch.

An electronic ink may be placed on the pattern sheet, to change the order of key arrangements or key input values.

An NFC module may be provided in the main body.

The key assembly may comprise a plurality of hotkeys, the hotkeys may be ordered to set NFC tags, and a Bluetooth or WIFI connection may be established through the set NFC tags.

If terminals are allocated to all of the hotkeys, the previously allocated terminals may be automatically deleted to connect with newly tagged terminals.

If terminals are allocated to all of the hotkeys, the user may be informed that terminals tagged afterwards are not to be allocated, and the previously allocated terminals may be deleted to allocate newly tagged terminals If terminals are allocated to all of the hotkeys, the user may be informed that terminals tagged afterwards are not to be allocated, and the previously allocated terminals may be deleted to allocate newly tagged terminals At least one of a power key, a speaker, an internal battery charging port, a pairing key, and a an external battery charging port may be formed at one end portion of the main body.

A polyurethane (PU) material may be used for the front sheet and the rear sheet, and a PET film may be used for the pattern sheet.

A hall sensor may be provided in the main body, and a magnet may be provided in the key assembly, so that power supply is controlled based on whether the hall sensor and the magnet come into contact with each other.

According to an embodiment of the present invention, a portable keyboard offers enhanced portability because it can be rolled up like a scroll.

Moreover, a portable keyboard with two speakers can be used to implement a stereos assembly.

In addition, a capacitive or pressure-sensitive keyboard can be used for a thinner profile to make it easier to roll it up in various shapes.

MODES FOR CARRYING OUT THE PREFERRED EMBODIMENTS

Hereinafter, a portable keyboard according to an embodiment of the present invention will be described in detail with reference to the drawings. The suffixes "unit" and "part" used in the following description are given only for the purpose of ease of description of the present specification and do not have an important meaning or role in and of themselves.

Figure 1:
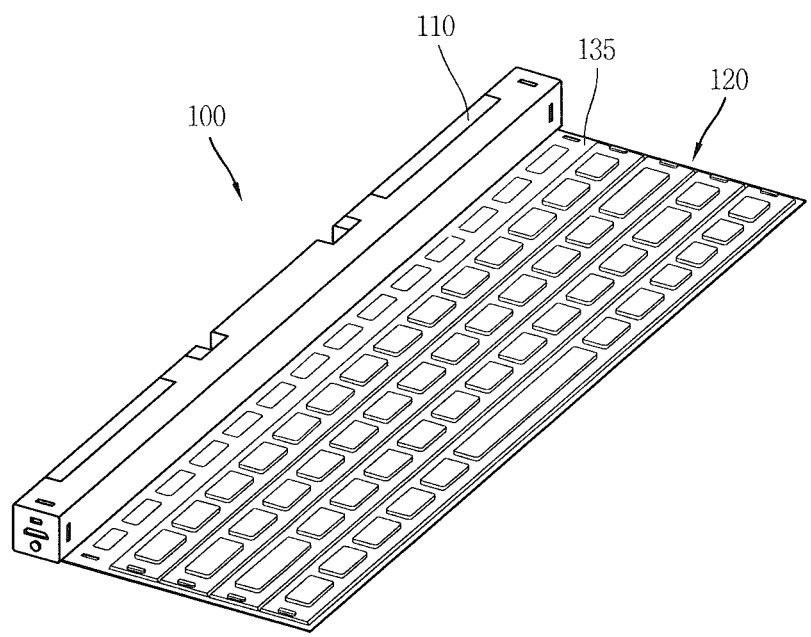
FIG. 1 is an overall perspective view of a rectangular portable keyboard according to one embodiment of the present invention.
Figure 2A:
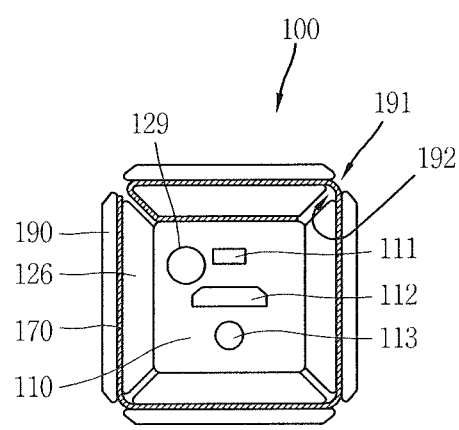
FIGS. 2A and 2B are a side view and partial enlarged view of the portable keyboard of FIG. 1 in a rolled-up position.
Figure 2B:
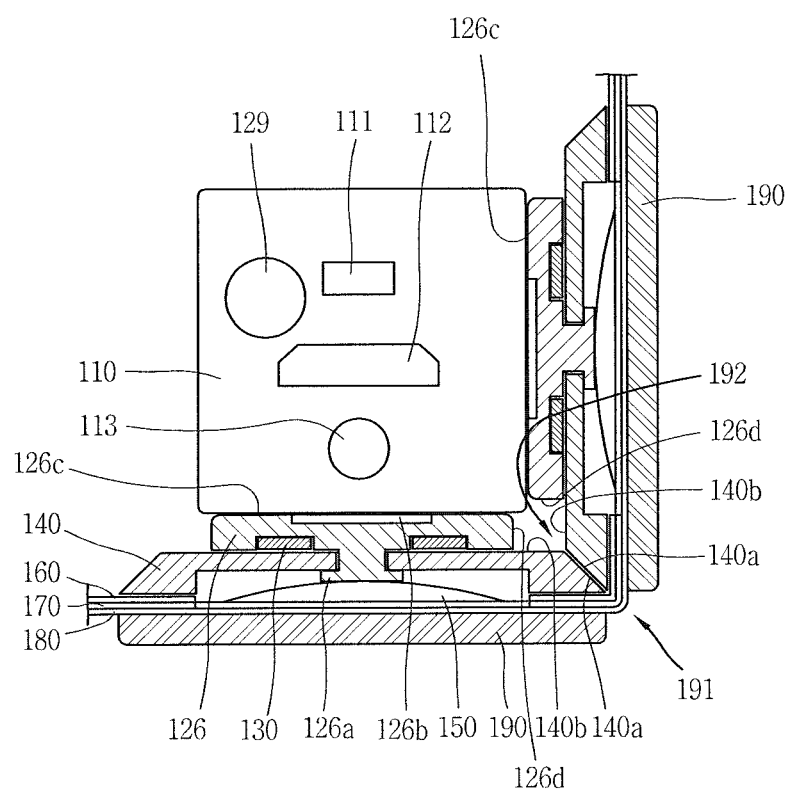
Figure 3:
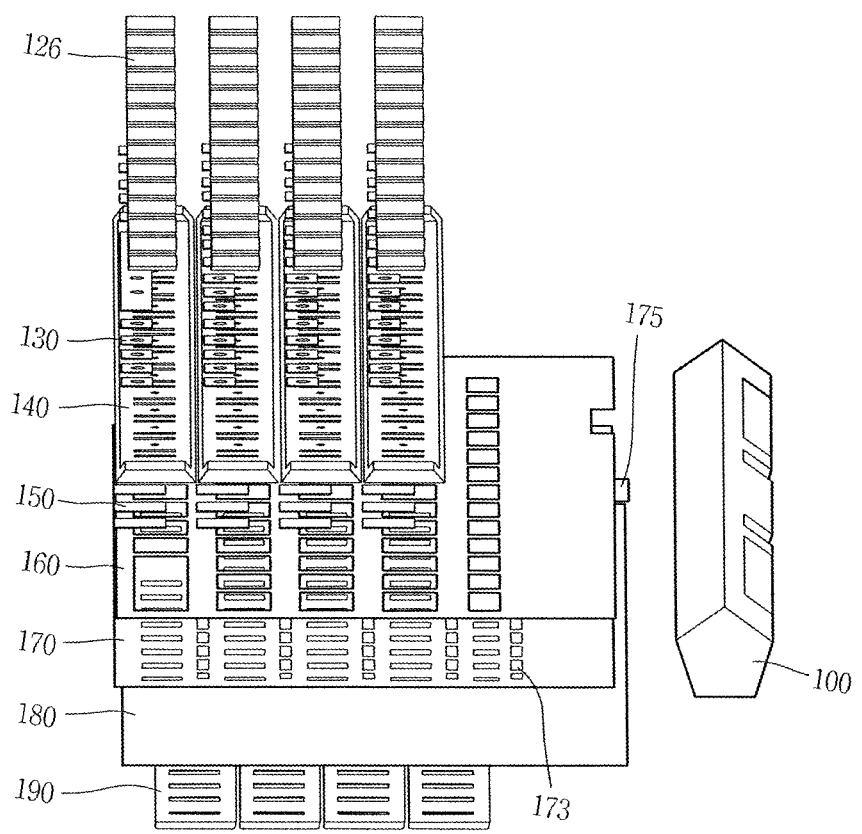
FIG. 3 is an exploded perspective view of the portable keyboard of FIG. 1.
Figure 4:
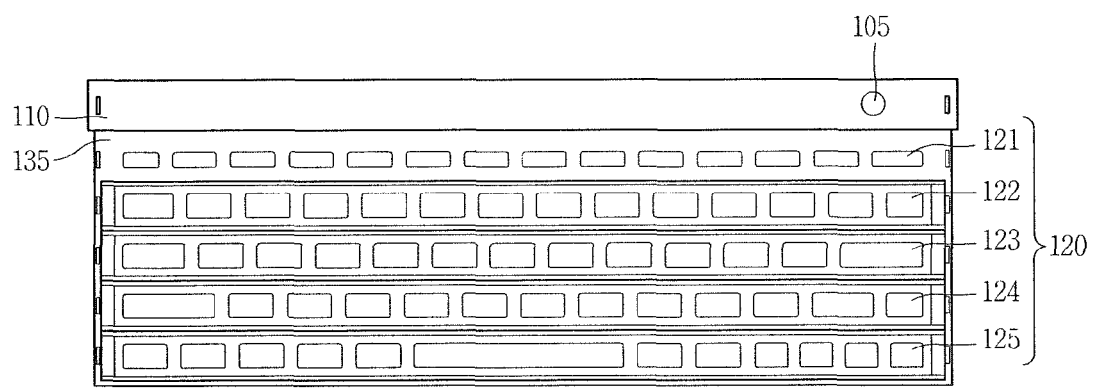
FIG. 4 is a top plane view of the portable keyboard in an opened position according to one embodiment of the present invention.

First of all, FIG. 1 is an overall perspective view of a rectangular portable keyboard 100 according to one embodiment of the present invention, FIGS. 2A and 2B are a side view and partial enlarged view of the portable keyboard 100 of FIG. 1 in a rolled-up position, FIG. 3 is an exploded perspective view of the portable keyboard 100 of FIG. 1, and FIG. 4 is a top plane view of the portable keyboard in an opened position according to one embodiment of the present invention.

Mobile terminals 200 described in this specification may include Bluetooth-enabled phones, smart phones, laptop computers, digital broadcast terminals, PDAs (personal digital assistants), PMPs (portable multimedia players), E-book readers, navigation devices, etc.

In one embodiment of the present invention, the portable keyboard 100 may be formed into a polygon, more specifically, a rectangle or a pentagon, and is almost identical in internal structure and configuration, except for its profile. One embodiment of the present invention provides a method of rolling up the portable keyboard 100 into a rectangular or pentagonal shape.

Figure 5:
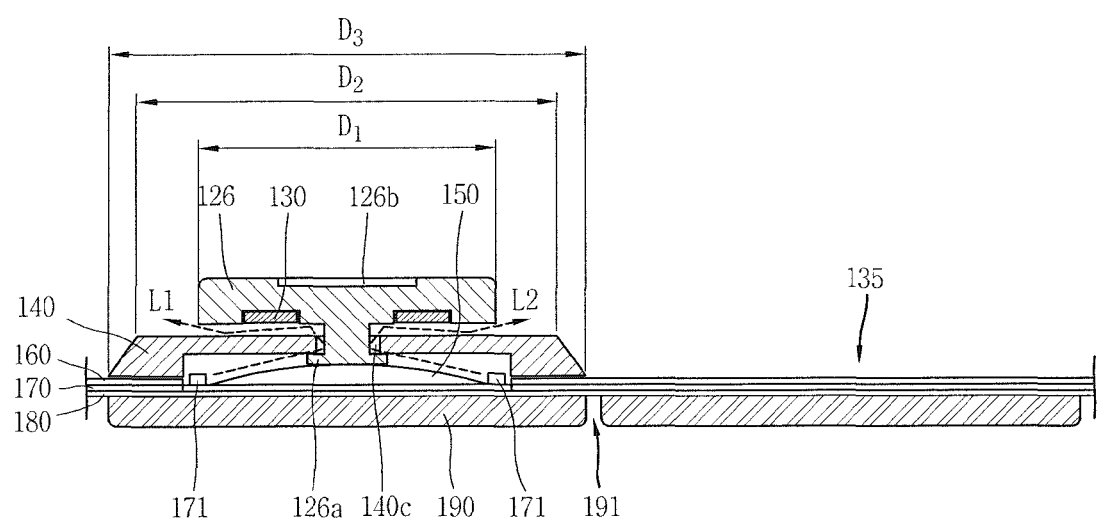
FIG. 5 is a partial cross-sectional view of a key assembly according to one embodiment of the present invention.
Figure 17:
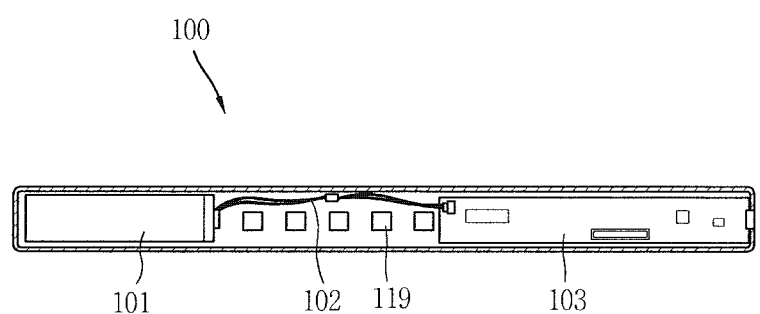
FIG. 17 is an internal schematic view of the main body according to one embodiment of the present invention.

FIG. 5 is a partial cross-sectional view of a key assembly 120 according to one embodiment of the present invention, and FIG. 17 is an internal schematic view of a main body according to one embodiment of the present invention. Referring to FIGS. 1, 5, and 17, the portable keyboard 100 according to one embodiment of the present invention includes a main body 110 with an internal battery 101, in the shape of a polygonal pillar, a key assembly 120 connected to the main body 110 and having a plurality of key arrangements, and a flexible connecting member 135 connecting the key assembly 120 and the main body 110 and extending to the bottom of the key assembly 120. At least one key arrangement 121 or 125 of the key assembly 120 allows information to be entered by touch, and also allows the key assembly 120 to be rolled up. To this end, in one embodiment of the present invention, a touch-type keyboard is used for part of the key assembly 120. More specifically, a capacitive or pressure-sensitive keyboard is used for some key arrangements.

The key assembly 120 has a plurality of arrangements, and although FIG. 4 illustrates first to fifth key arrangements 121, 122, 123, 124, and 125, only four key arrangements may be provided if needed. FIGS. 3 and 4 illustrate that the first key arrangement 121 is touch-type. The first key arrangement 121 is usually touch-type, but the present invention is not limited thereto and the fifth key arrangement 125 may be touch-type.

Referring to FIGS. 2A, 2B, and 5, the connecting member 135 includes a pattern sheet 170 with a printed circuit board pattern 173 formed on it, and a front sheet 160 and a rear sheet 180 that are placed on the top and bottom of the pattern sheet 170 and protect the pattern sheet 170. The connecting member 136 according to one embodiment of the present invention includes the front sheet 160, the pattern sheet 170, and the rear sheet 180. Since these sheets are made of thin material, the first key arrangement 121 in the first row of the key assembly 120 can be easily rolled up. In this instance, the connecting member 135 extends to the bottom of the mechanical key arrangements 122, 123, 124, and 125.

FIG. 2A illustrates that the first key arrangement 121 is touch-type and the other key arrangements 122, 123, 124, and 125 are mechanical. FIG. 2B illustrates that the mechanical key arrangements are being rolled up. As shown in FIG. 2B, the connecting member 135 has a bending portion 191. To make the connecting member 135 bend like that, in one embodiment of the present invention, PU (polyurethane) material is used for the front sheet 160 and the rear sheet 180, and a PET film is used for the pattern sheet 170.

Characters, numbers, etc. are printed on some part 126b of the top surface 126c of a key 126, the top surface 126c is in contact with one side of the main body 110, the side 126d of the key 126 is spaced apart from the side 126d of a nearby key 126, and the side 140a of a key supporting part 140 is sloped. Adjacent sides 140a may be placed parallel to each other when they are rolled up, so that they are not in contact with each other. Even if the sides 140a are in contact with each other, the two key support parts 140, which are brought close to each other by the contact, should make a right angle. In this case, the sides 126d of the keys 126 also should be placed in such a way that they are not in contact with each other.

In this instance, the key 126 may be brought into contact with the top surface 140b of the key supporting part 140. The width D2 of the top surface 140b is smaller than the width D3 of the key supporting part 140 because the width D1 of the key 126 is smaller than the width D2 of the top surface 140b and the side 140a is sloped.

Meanwhile, the width L of the main body 110 is associated with the widths D3 of the key support parts 140 in the key arrangements 121, 122, 123, 124, and 125. Since the widths D3 of the key support parts 140 increase with the width L, the main body 110 too large in size may make it difficult to form the key assembly 120. To increase the size of the main body 110, it is necessary that the key arrangements 121, 122, 123, 124, and 125 are widely spaced.

Moreover, the key 126 has a separation preventing part 126a, which is a lateral extension of the bottom, to prevent it from falling off. The separation preventing part 126a is formed in such a way that a portion extending through a through-hole 140c in the key supporting part 140 and contacting a dome 150 has a larger diameter than the through-hole 140c.

As shown in FIG. 4, a touchpad 105 is provided on the outer surface of the main body 110. The touchpad 105 functions to move a cursor or mouse arrow in the direction of a touch. More specifically, the position of the cursor or mouse arrow on the mobile terminal 200 paired with the portable keyboard 100 is changed by touching the touchpad 105 in a particular direction.

In one embodiment of the present invention, a combination of a mechanical keyboard and a touch-type keyboard (capacitive or pressure-sensitive) is employed. The electrostatic keyboard is able to detect even a gentle press on a key since it generates a signal by sensing a voltage difference, unlike the mechanical keyboard, whereas the mechanical keyboard generates a signal by sensing a pressure difference.

The main body 110 includes a setup part 220 that can be unfolded outwards where the mobile terminal 200 can be set up. The setup part 220 includes a pair of rotary members 221 and 222. That is, the rotary members 221 and 222 are spaced a predetermined distance apart from each other, and can be folded onto or unfolded from the main body 110 as they rotate in opposite directions. Although one embodiment of the present invention has been described with respect to two rotary members 221 and 222, the present invention is not limited thereto and three or more rotary members 221 and 222 may be included and they may rotate in the same direction as well.

Figure 8:
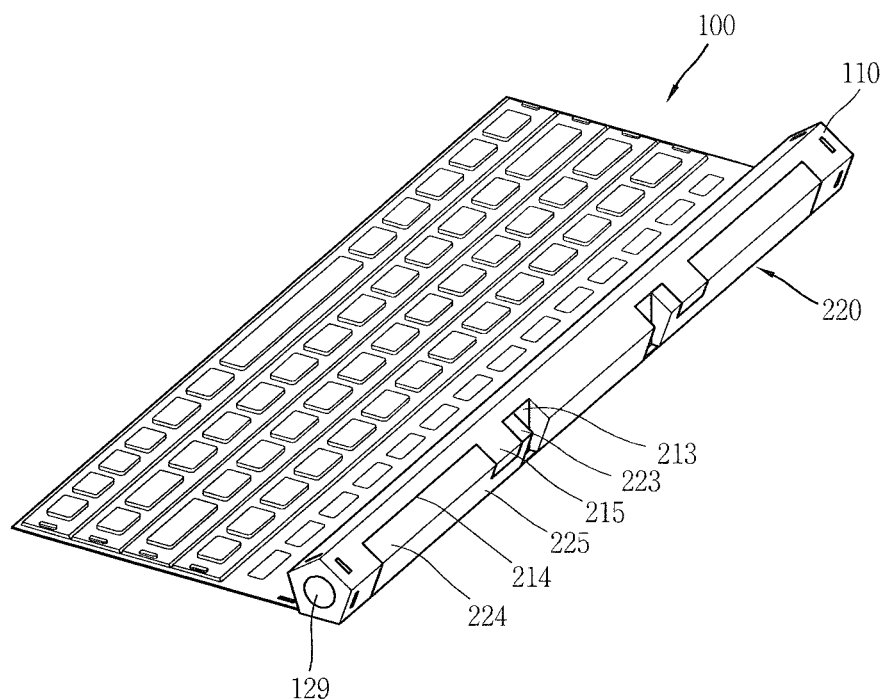
FIGS. 8 and 9 are perspective views of the portable keyboard when a setup part is in a folded-up position according to one exemplary embodiment of the present invention.
Figure 9:
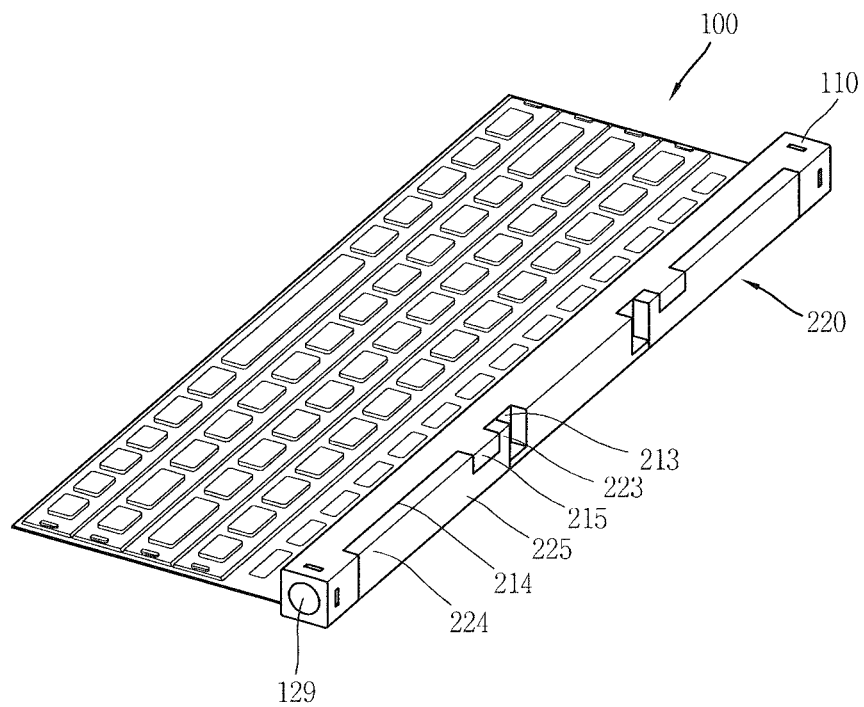
Figure 10:
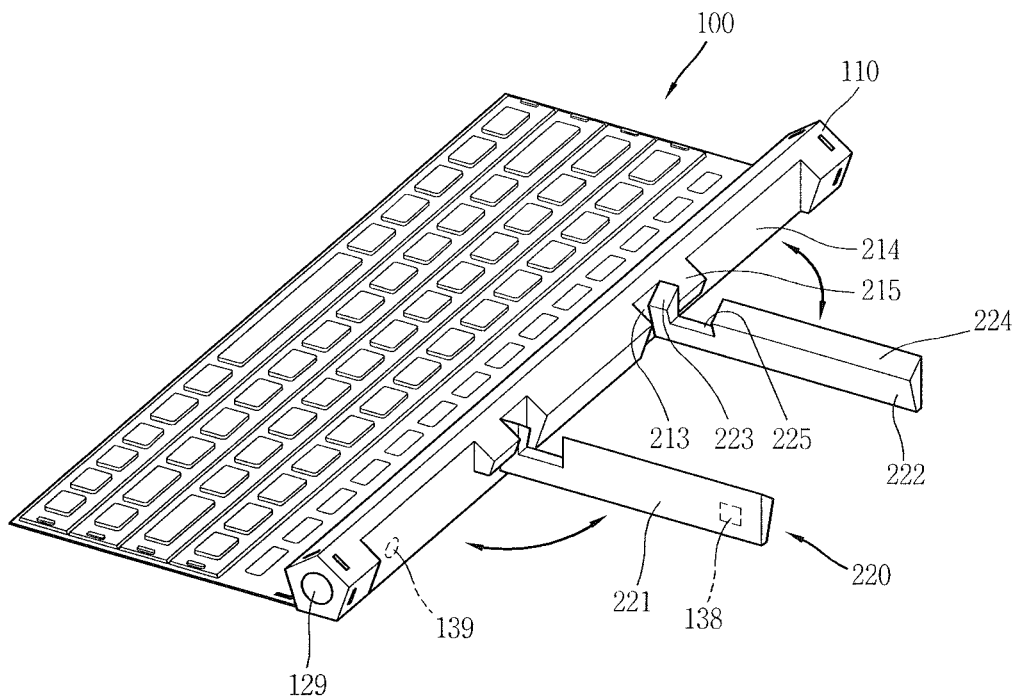
FIGS. 10 and 11 are perspective views of the portable keyboard when the setup part is in an opened position according to one embodiment of the present invention.
Figure 11:
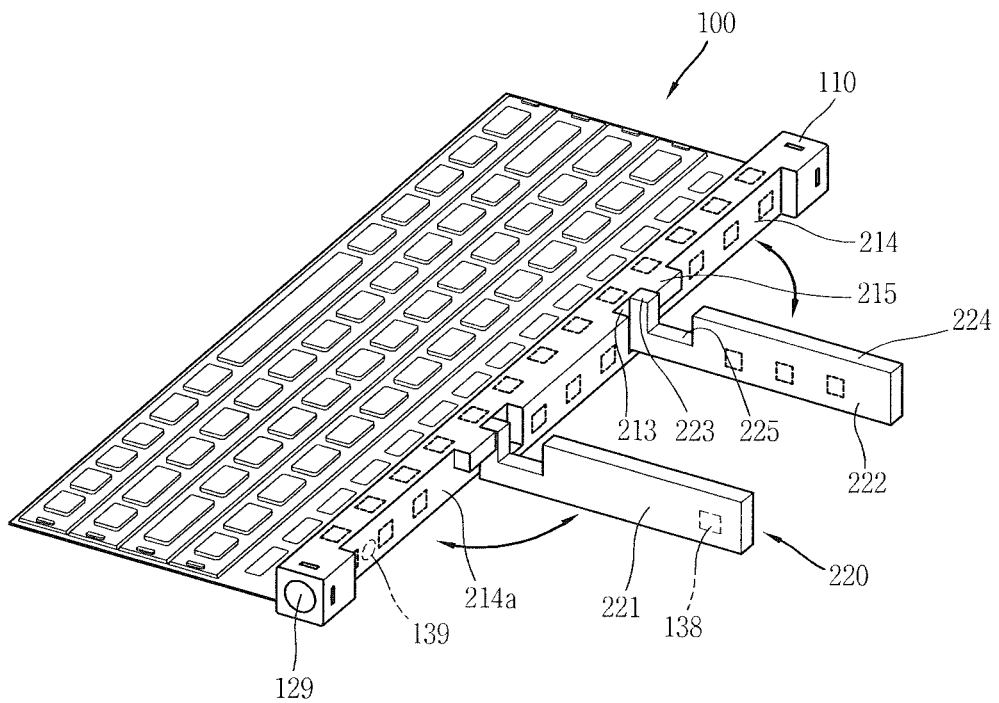

FIGS. 8 and 9 are perspective views of the portable keyboard 100 when the setup part 220 is in a folded-up position according to one exemplary embodiment of the present invention. FIGS. 10 and 11 are perspective views of the portable keyboard 100 when the setup part 220 is in an opened position according to one embodiment of the present invention.

Referring to FIGS. 8 to 11, the rotary members 221 and 222 will be described more concretely. The rotary members 221 and 222 each include a hinge part 223 that is rotatable while fixed at the main body 110, a fitting part 225 that extends from the hinge part 223 and has a slot to fit the mobile terminal 200 in, and a supporting part 224 that extends from the fitting part 225 and restrains the mobile terminal 200 from moving. The hinge part 223, the fitting part 225, and the supporting part 224 are integrally formed, and shaped like a plate with a slot to fit the mobile terminal 200 in. The rotary members 221 and 222 may form an approximately U-shape.

To connect with the rotary members 221 and 222, the main body 110 includes a hinge fixing part 213 that is recessed inwards from the main body 110 and provides space where the hinge part 223 can rotate, a protruding part 215 that is formed on one side of the hinge fixing part 213 that the fitting part 225 can be inserted and fit into, and a recessed part 214 for fitting the supporting part 224 in. With these parts fitting together, the main body 110 has a flat, polygonal profile. That is, the rotary members 221 and 222, which are rotatable around the hinge part 223, come into close contact with the main body 110 when folded onto the main body 110, thus making the main body 110 flat in appearance.

FIG. 5 is a cross-sectional view of the key assembly 120 and the connecting member 135 according to one embodiment of the present invention. First off, a mechanical key arrangement will be described. The mechanical key arrangement includes a key 126 to be pressed by the user that is placed on the top, a key support 140 (dummy) that is placed underneath the key 126, supports the key 126, and has a through-hole 140c to pass the lower end of the key 126 through, and a second element 130 provided at the bottom of the key 126. Besides, a dome 150 is provided on the pattern sheet 170.

The connecting member 135 includes a pattern sheet 170 placed under the key support 140 and having a dome 150, a front sheet 160 placed over the pattern sheet 170, and a rear sheet 180 placed under the pattern sheet 170 and supporting the pattern sheet 170.

Meanwhile, in one embodiment of the present invention, magnetic force is used to keep the key assembly 120 from being unrolled as the key assembly 120 is rolled up around the main body 110.

That is, the main body 110 and the key assembly 120 have a first element 119 and the second element 130, respectively. The first element 119 and the second element 130 each may be a magnet or a steel sheet. More specifically, if the first element 119 is a steel sheet, the second element 130 may be a magnet or a steel sheet, and if the first element 119 is a steel sheet, the second element 130 may be a magnet. FIG. 3 illustrates that the second element 130 is a steel sheet.

If the first element 119 and the second element 130 are both magnets, the first element 119 is covered with a yoke 119a to further improve the magnetic force. Using the yoke 119a in this way, the N and S poles of the first element 119 are aligned opposite to the N and S poles of the second element 130. The first and second elements 119 and 130 aligned opposite to each other may be fixed at a given position by the attractive force of the adjacent magnets.

Moreover, the attractive force between the first and second elements 119 and 130 may be further improved by the yoke 119a. That is, the lines of magnetic force are deflected to the space between the first and second elements 119 and 130 so that the lines of magnetic force formed between the first and second elements 119 and 130 can be increased. Hence, the adhesion force between the first and second elements 119 and 130 is increased.

Figure 16:
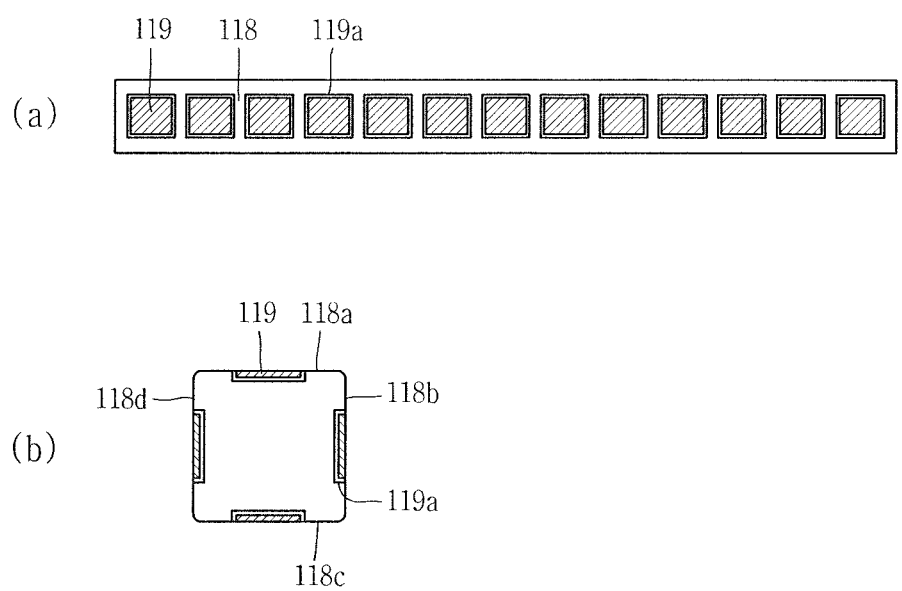
FIG. 16 is a view for explaining magnets provided in the main body according to one embodiment of the present invention.

If the second element 130 is a steel sheet, the magnet 119 and the steel sheet 130 come into contact with each other by magnetic force when the portable keyboard 110 is rolled up, making it easy to roll up the key assembly 120. If the first element 119 and the second element 130 are both magnets, the magnet 119 is embedded in each side 118, 118a, 118b, 118c, and 118d within the main body 110 as shown in FIG. 16, and the magnet 130 is provided under the key 126, thereby making it easy to roll up the main body 110 and the key assembly 120 by the attractive force between the magnets 119 and 130.

Figure 14:
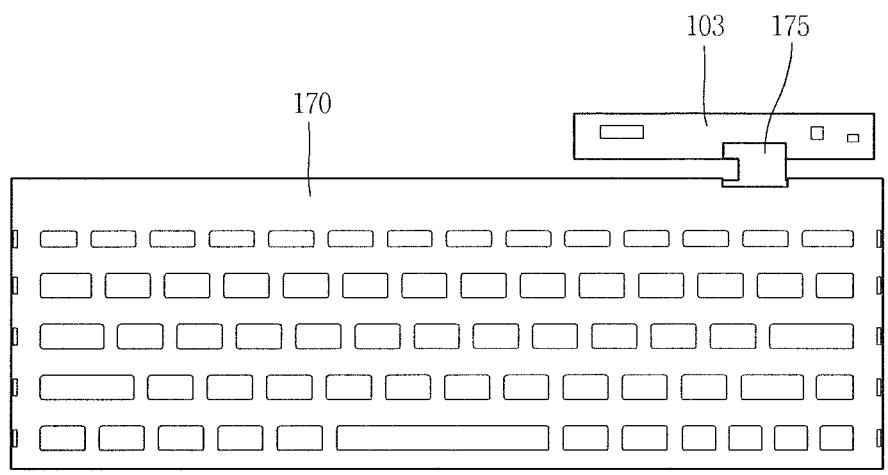
FIG. 14 is a schematic view of a pattern sheet according to one embodiment of the present invention.

As shown in FIG. 14, a connector 175 is provided on one side of the pattern sheet 170 and electrically connected to a printed circuit board 103 provided in the main body 110. FIG. 17 is an internal schematic view of a main body according to one embodiment of the present invention. Referring to FIG. 17, an internal battery 101 is provided in the portable keyboard 100, and the internal battery 101 is connected to the printed circuit board 103, which is a control part, by a cable 102. The positions of the printed circuit board 103 and internal battery 101 may be changed.

A metal sheet 190 is further provided underneath the rear sheet 180. The metal sheet 190 is made of an aluminum-containing material, and serves to put a weight on the key assembly 120 and allow the key assembly 120 to be rolled up, forming a polygonal shape.

Figure 6:
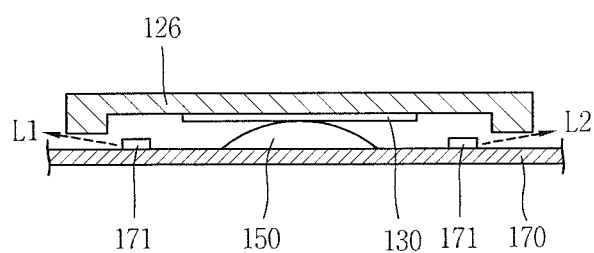
FIGS. 6 and 7 are views for explaining a connection between a key and a pattern sheet according to one embodiment of the present invention.
Figure 7:
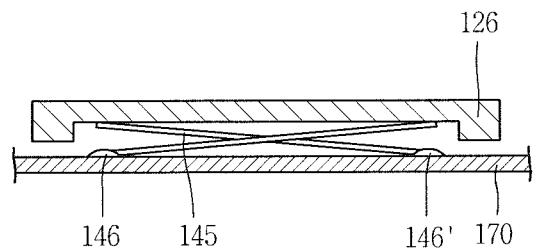

FIGS. 5 and 7 are views for explaining a connection between the key 126 and the pattern sheet 170 according to one embodiment of the present invention. In one embodiment of the present invention, an eye-catching decoration may be put up in order to get light leak around the key 126. To this end, in one embodiment of the present invention, a light source 171 is placed on the pattern sheet 170. The light source 171 may be an LED. FIGS. 5 and 6 illustrate that light beams L1 and L2 from the light source 171 are leaking out of the key 126.

In FIG. 6, a raised dome 150 is formed underneath the key 126. If the edge of the key 126 is pressed, the dome 150 may not be correctly pressed. FIG. 7 depicts a structure for preventing this. An X-shaped elastic member 145 is provided underneath the key 126, the elastic member 145 is brought into contact with the pattern sheet 170, and second domes 146 and 146' are formed between the elastic member 145 and the pattern sheet 170. With this structure, if the top side of the key 126 is pressed, the portion pressed by the elastic member 145 and the opposite portion press the second domes 146 and 146' while being kept horizontal. In this instance, no magnet or steel sheet is needed since the elastic member 145 is made of steel.

The electrostatic or pressure-sensitive key arrangement 121 according to one embodiment of the present invention may work by means of the devices provided on the pattern sheet 170, and other components like a physical key 126 are not necessary.

FIGS. 2A and 2B are side views of the portable keyboard 100 in a rolled-up position. Referring to FIG. 2A, a power key 111, a charging port 112, a pairing key 113, and a speaker 129 are formed on one side of the main body 110.

The power key 111 is for supplying power to the portable keyboard 100, and the charging port 112 is for charging the internal battery 101 embedded in the portable keyboard 100. The pairing key 113 is a button used to pair the portable keyboard 100 with the mobile terminal 200. That is, a nearby mobile terminal 200 can be detected and wirelessly connected by pressing the pairing key 113. The speaker 129 on the portable keyboard 100, apart from the speaker on the mobile terminal 200, allows the user to listen to music, etc. when the portable keyboard 200 is paired with the mobile terminal 200 and the user wants to play music, etc.

Figure 12:
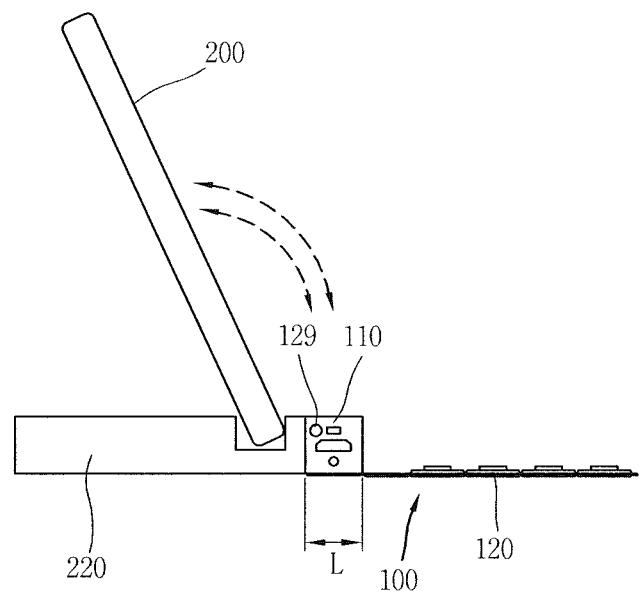
FIG. 12 is a cross-sectional view of a mobile terminal being set up on the portable keyboard according to one embodiment of the present invention.

FIG. 12 is a cross-sectional view of the mobile terminal being set up on the portable keyboard according to one embodiment of the present invention. When the user makes a key entry using the key assembly 120 while the main body 110 is paired with the mobile terminal 200, the mobile terminal 200 plays music, video, etc. and sends a signal to the portable keyboard 100 to output sound through the speaker 129. That is, when the portable keyboard 100 sends a key input signal to the mobile terminal 200, the mobile terminal 200 receives it and plays music or video.

Figure 13:
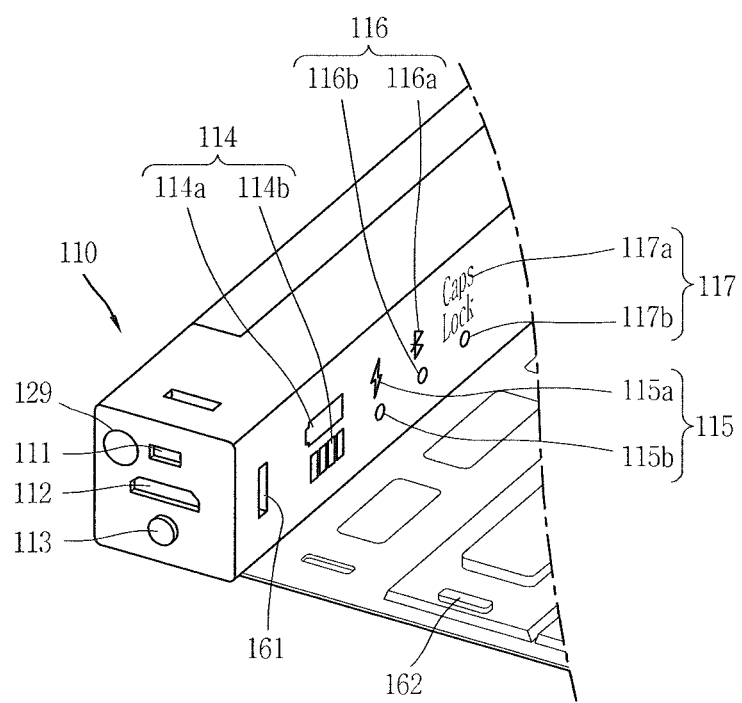
FIG. 13 is a side perspective view of the portable keyboard according to one embodiment of the present invention.

FIG. 13 is a partial perspective view of an end portion of the main body 110 according to one embodiment of the present invention. Referring to FIG. 13, the portable keyboard 100's battery status part 114, battery charge indicator 115, wireless connection indicator 116, a Caps lock indicator 117, etc. are placed on one side of the main body 110.

That is, a battery indicator 114a, a charge status indicator light 114b that shows how much charge is left in the battery, a Bluetooth indicator 116a, a Bluetooth connection indicator light 116b that shows if a Bluetooth connection is established, a battery charging indicator 115a, and a charge indicator light 115b that shows if the battery is charged are provided. Also, a Caps lock indicator 117a and an indicator light 117b are provided to let the user know if it is uppercase or lowercase.

Meanwhile, power can be supplied depending on whether the setup part 220 is opened, rather than whether the key assembly 120 is rolled up. That is, power may be supplied when the rotary members 221 and 222 are unfolded, and the power supply may be stopped when the rotary members 221 and 222 are folded up. Also, when the key assembly 120 is opened, power may be supplied, and the power supply may be stopped when the key assembly 120 is rolled up.

If the user wants to use the speaker 129 while the key assembly 120 is in a rolled-up position, the power key 111 may be used.

In case the user wants to supply power depending on whether the key assembly 120 is rolled up, magnets (not shown) may be embedded in the fifth key arrangement 125 and hall sensors may be embedded in the main body 110, so as to detect whether the key assembly 120 is rolled up, by using the magnet and the hall sensor 139. Also, the hall sensors may be embedded in the main body 110 and the magnets 138 may be embedded in the rotary members 221 and 222, so as to detect whether the rotary members 221 and 222 are unfolded, by using the hall sensor 139 and the magnet 138. The positions of the hall sensor 139 and magnet 138 can be inverted. The hall sensor 139 will be described later.

Although the foregoing description has been made with respect to an example in which the key assembly 120 can be easily rolled up by the first and second elements 119 and 130 being held together by attractive force, other various methods, apart from the method using attractive force, may be used. For example, as shown in FIG. 13, slots 161 may be formed on each side of the main body 110, and bosses 162 corresponding to the slots 161 may be formed at the ends of each of the key arrangements 121, 122, 123, 124, and 125, so that the key assembly 120 can be easily rolled up by a concavo-convexed coupling of the slots 161 and the bosses 162. This will be described later.

The portable keyboard 100 according to the present invention may use short-range communication technologies such as Bluetooth, RFID (Radio Frequency Identification), infrared data association (IrDA), UWB (Ultra Wideband), ZigBee, NFC (Near Field Communication), and so on.

Among them, an NFC module provided in the portable keyboard 100 supports device-to-device contactless short-range wireless communication from a distance of 10 cm or so. The NFC module can work in either card mode, reader mode, or P2P mode. In order for the NFC module to work in card mode, the portable keyboard 100 may further include a security module for storing card information. The security module may be a physical medium such as UICC (Universal Integrated Circuit Card) (e.g., SIM (Subscriber Identification module) or USIM (Universal SIM), Secure micro SD, or a sticker, or a logical medium (e.g., embedded SE (Secure element) embedded in the mobile terminal. SWP (Single Wire Protocol)-based data exchange may occur between the NFC module and the security module.

If the NFC module works in card mode, the portable keyboard 100 may transmit card information stored in it to the outside, like traditional IC cards.

If the NFC module works in reader mode, the portable keyboard 100 may read data from external tags. Data the mobile terminal receives from tags may be encoded in the NFC data exchange format defined by the NFC forum. In addition, the NFC form defines four record types. Specifically, the NFC defines four record types (Record Type Definition): smart poster, text, URI (Uniform Resource Identifier), and general control. If data received from a tag is smart poster type, the control part may execute a browser (e.g., internet browser). If data received from a tag is text type, the control part may execute a text viewer. If data received from a tag is URI type, the control part may execute a browser or make a phone call. If data received from a tag is general control type, the control part may execute a proper operation depending on what to control.

If the NFC module works in P2P mode, the portable keyboard 100 may perform P2P communication with another mobile terminal. In this case, LLCP (Logical Link Control Protocol) may be used for P2P communication. For P2P communication, a connection may be established between the portable keyboard 100 and another mobile terminal. The established connection may be divided into connectionless mode that is finished after an exchange of one packet and connection-oriented mode that allows for continuous packet exchange. Data such as electronic name cards, contact information, digital photographs, or URLs, and setup parameters for Bluetooth and Wi-Fi connections may be exchanged through P2P communication. However, P2P mode may be used efficiently for exchange of small-size data because the working distance of NFC communication is short.

In one embodiment of the present invention, the key assembly 120 includes a plurality of hotkeys, the hotkeys are ordered to set NFC tags, and a Bluetooth or WIFI connection can be established through the set NFC tags.

If terminals are allocated to all of the hotkeys, no more terminals tagged afterwards can be allocated. In this case, the previously allocated terminals may be automatically deleted to connect with newly tagged terminals. Otherwise, the user may be informed that terminals tagged afterwards cannot be allocated, and the previously allocated terminals may be deleted to allocate newly tagged terminals.

Moreover, if terminals are allocated to all of the hotkeys, the allocated terminals may be deleted by pressing the hotkeys long. Once the allocated terminals are deleted, new terminals can be allocated.

Meanwhile, in one embodiment of the present invention, electronic ink is placed on the pattern sheet 170 to change the characters, numbers, etc. printed on the keys 126 of any one of the key arrangements. The electronic ink is a black-and-white display in which multiple capsules are provided between two panels, each capsule functions as a pixel, and white and black particles move in response to an electronic signal.

The electronic ink commonly refers to types of ink that are applicable to a variety of electronic part materials such as printed circuit boards (PCB, FPCB, etc.), displays (LCD, PDP, OLED, etc.), RFID, smart labels, and so on. The electronic ink may be classified into metal ink, ceramic ink, molecular ink, etc. In this case, paste ink, nano ink, etc. can be used as the metal ink. These types of metal ink have conductivity and therefore act as a circuit when printed on a circuit board by a printing technique.

In one embodiment of the present invention, the first key arrangement 121 may work as electrostatic type by using the electronic ink, and at the same time, the order or input values of the keys on the first key arrangement 121 may be changed. For example, the keys F1 and F2 on the first key arrangement 121 may be changed to number keys 1 and 2.

Using the above method, the fifth key arrangement 125 may work as touch type. Usually, the fifth key arrangement 125 works as electrostatic type and is used as a typical keyboard using electronic ink. Also, the fifth key arrangement 125 may be switched to arrow keys when playing music or video.

Figure 15:
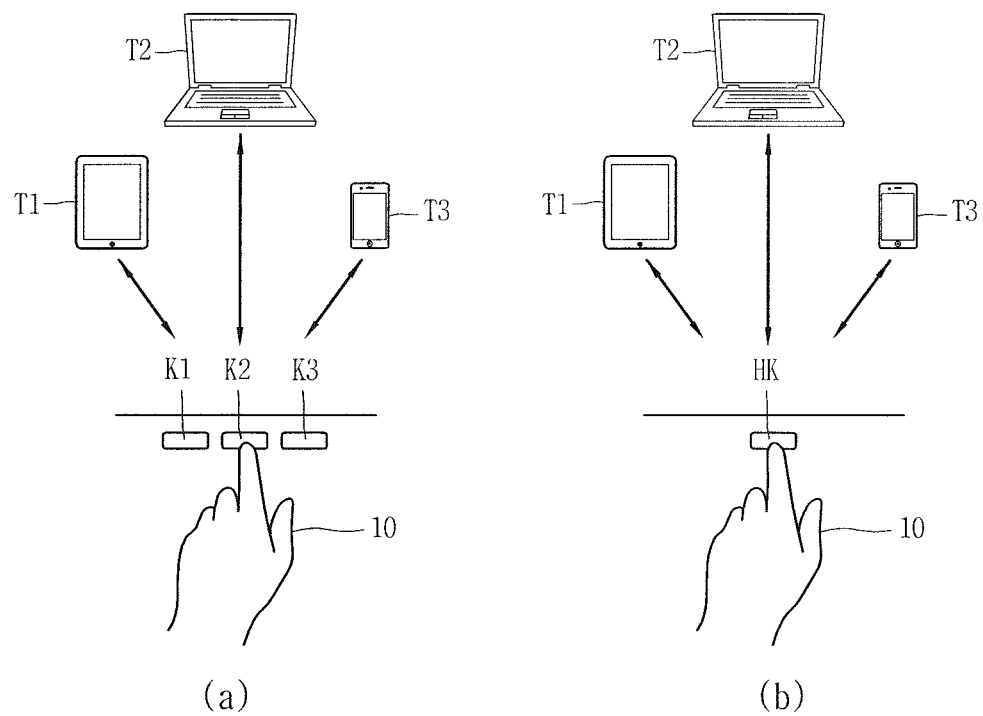
FIG. 15 shows an example of pairing the portable keyboard according to one embodiment of the present invention.

In one embodiment of the present invention, hotkeys may be provided as shown in FIG. 15. The key assembly 120 may include a plurality of hotkeys.

As shown in FIG. 15A, different terminals T1, T2, and T3 may be allocated to different hotkeys K1, K2, and K3, respectively, by the user 10. If the terminals T1, T2, and T3 are allocated to the hotkeys K1, K2, and K3 in a one-to-one basis, the hotkeys are paired with the corresponding terminals when pressed.

For example, if the terminal T1 is allocated to the hotkey K1, the hotkey K1 is paired with the terminal T1 when pressed.

Although the foregoing description has been made with respect to a plurality of hotkeys, a plurality of terminals T1, T2, and T3 may be paired with a single hotkey HK in one embodiment of the present invention. To this end, it is necessary to set up an order for the terminals T1, T2, and T3 to be allocated to the hotkey HK.

Once a predetermined order is set up to allocate the terminals T1, T2, and T3, the hotkey HK may be paired with the different terminals T1, T2, and T3 in the predetermined order when pressed. For example, if the hotkey HK is configured to be paired with the terminal T1 when pressed once, the terminal T2 when pressed twice, and the terminal T3 when pressed three times, the hotkey HK may be pressed three times in a row to be paired with the terminal T3.

Figure 19:
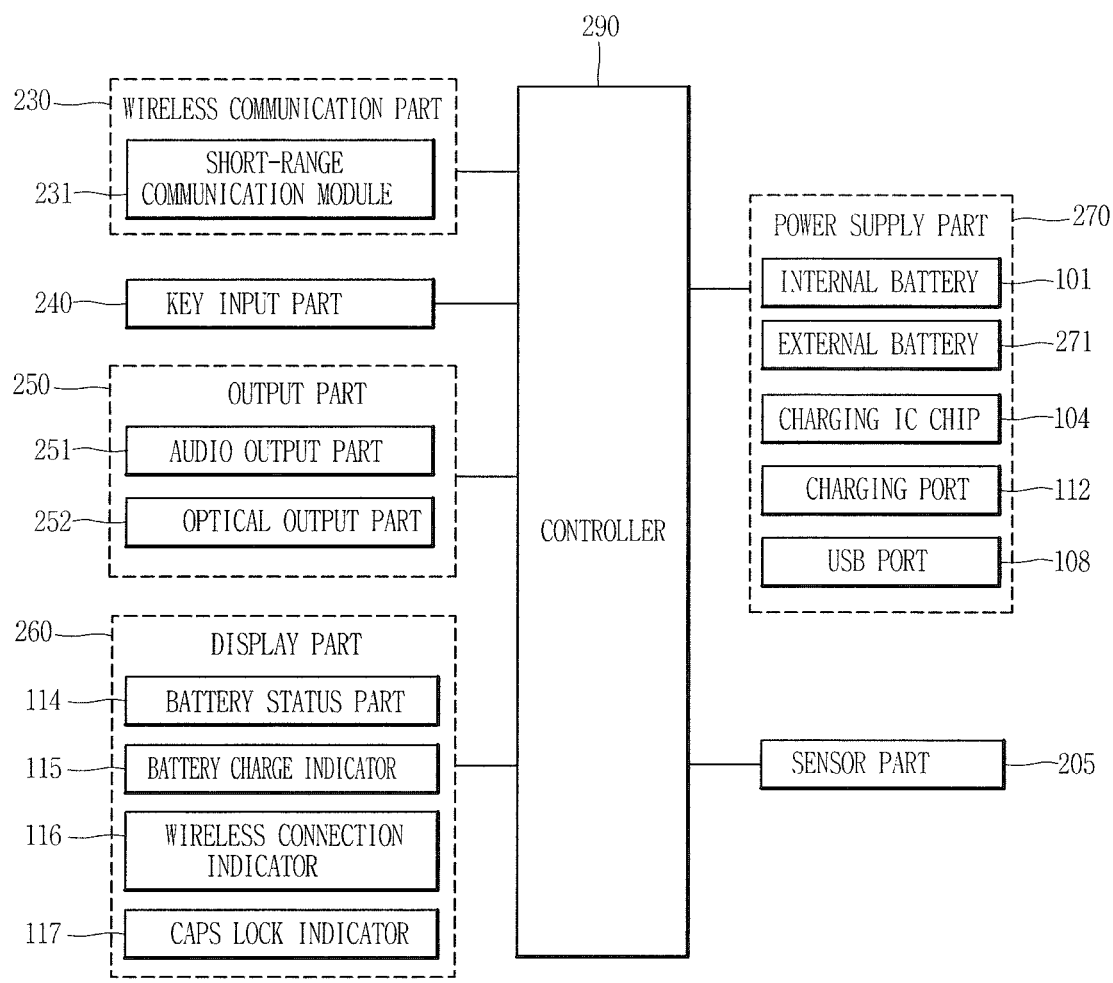
FIG. 19 is a block diagram of the portable keyboard according to one embodiment of the present invention.

FIG. 19 is a block diagram for explaining the portable keyboard according to the present invention. The portable keyboard may include a wireless communication part 230, a key input part 240, an output part 250, a power supply part 270, a sensor part 105, and a display part 260. The components shown in FIG. 19 are not necessary to implement the portable keyboard, so the mobile terminal described in this specification may have more or less components than those listed above.

More specifically, the wireless communication part 230, among these components, may include one or more modules that enable wireless communication between the portable keyboard 100 and the wireless communication system such as a mobile terminal 200.

Typically, the wireless communication part 230 may be a short-range communication module 231, and may include at least one among a wireless internet module, a broadcast receiving module, a mobile communication module, and a location information module.

The key input part 240 is for entering numbers, characters, etc. required for the user to use the mobile terminal by means of the portable keyboard. Data collected by the key input part 240 may be transmitted to the mobile terminal by the controller 290.

The sensor part 105 may include at least one among a proximity sensor, a touch sensor, an acceleration sensor, a motion sensor, a touch sensor, an RGB sensor, an IR (infrared) sensor, a finger scan sensor, an ultrasonic sensor, and an optical sensor. The sensor part 105 functions to move the mouse arrow or cursor on the mobile terminal 200 by capturing the user's motion.

The output part 250 may include at least either an audio output part 251 or an optical output part 252. The audio output part 251 may output audio data received from the wireless communication unit 230 or stored in the memory, in a call signal reception mode, a call mode, a recording mode, a voice recognition mode, and a broadcast reception mode. The audio output part 251 may output an audio signal (e.g., a call signal reception sound and a message reception sound) associated with a particular function performed by the portable keyboard. The audio output part 251 may include a receiver, a speaker, a buzzer, and so on.

The optical output part 252 may illuminate the outer edges of the keys 126 when the user opens the portable keyboard 100. The optical output part 252 may be a light source 171, for example.

The display part 260 is used to show various statuses to the user. The display part 260 may include a battery status part 114 that shows how much charge is left in the battery, a battery charge indicator 115 that shows how much the battery is charged, a wireless connection indicator 116 that shows if a wireless connection such as Bluetooth or WiFi is established, and a Caps lock indicator 117 that lets the user know if it is uppercase or lowercase.

The power supply part 270 may supply power to the internal battery 101 or an external battery 271 for a mobile terminal or the like under control of the control part 290. That is, the power supply part 270 includes the internal battery 101, which may be an embedded battery capable of charging, and may be detachably attached to the terminal body for charging or the like. In this case, the mobile terminal may be internally powered to supply the power required for the operations of the components.

The power supply part 270 may include a charging IC chip 104 for voltage boosting, a charging port 112 for charging the internal battery 101, and a USB port 108 for charging the external battery 271 embedded in the mobile terminal 200.

Figure 18A:
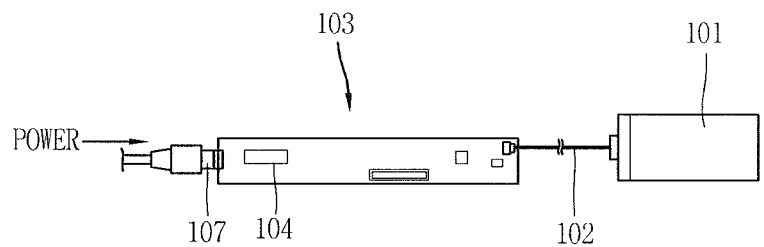
FIGS. 18A and 18B are views for explaining charging of an internal battery and an external battery according to one embodiment of the present invention.
Figure 18B:
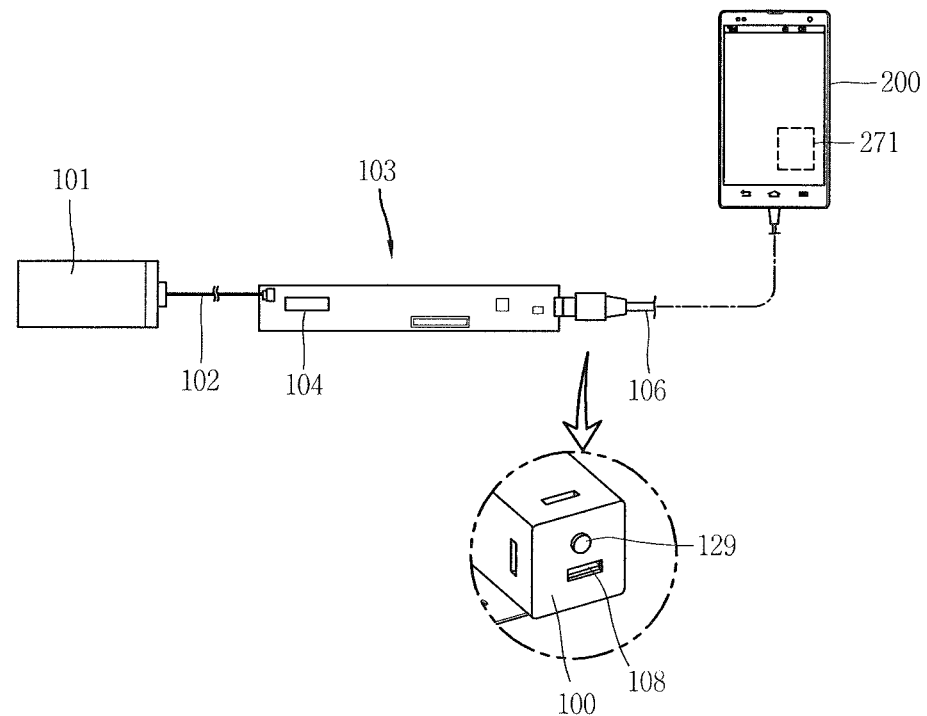

FIGS. 18A and 18B are views for explaining charging of the internal battery and the external battery according to one embodiment of the present invention. Externally-supplied voltages are often different from voltages used in portable keyboards. In this case, it is necessary to boost or lower the voltage. Referring to FIG. 18A, when 5V power enters the charging port 112 through a cable 107, the voltage should be converted to a voltage suitable for the internal battery 101. To this end, the charging IC chip 104 is provided in the printed circuit board 103 to convert the voltage. That is, the voltage drops from 5V to 3.7V by the charging IC chip 104. In this case, the charging IC chip 104 performs the same function as a DC/DC converter.

In this instance, external power may be applied through the charging port 112, and the charging port 112 may be configured as an example of an interface to which an external power source for supplying power to charge batteries is electrically connected.

In another example, the power supply part 270 may be configure to charge batteries in a wireless manner without using the connection port. In this case, the power supply part 270 may receive power from an external wireless power transmitter by using either one or both of inductive coupling based on magnetic induction and magnetic resonance coupling based on electromagnetic resonance.

Meanwhile, the mobile terminal 200 and the portable keyboard 100 need to be electrically connected through the USB port 108, in order to charge the external battery 271 of the mobile terminal, in which case voltage adjustment is needed as well.

That is, referring to FIG. 18B, power is supplied from the internal battery 101 by the cable 102, and the voltage of the internal battery 101 is about 3.7V. The voltage needs to be boosted to a voltage of about 5V to charge the external battery 271, which is done by the charging IC chip 104. Once the voltage is boosted by the charging IC chip 104, the external battery 271 is charged to the boosted voltage through a cable 106. To this end, the USB port 108 is provided on one surface of the main body 110 in one embodiment of the present invention. That is, the cable 106 is connected to the USB port 108. Consequently, voltage drop is required to charge the internal battery 101, and voltage boosting is required to charge the external battery 271. These conversions are done by the charging IC chip 104, and the voltage drop and the voltage boosting are opposite processes.

Typically, the controller 290 controls the overall operations of the portable keyboard, as well as the above operations associated with applications. The controller 290 may provide proper information or functions to the user or process them by processing input or output signals, data, information, etc. by the above-described components or running the applications stored in the memory.

Hereinafter, a portable keyboard and speaker assembly according to the present invention will be described in more detail with reference to the drawings. First of all, FIG. 20A is an overall perspective view of the portable keyboard 100 when the setup part 220 is in an opened position according to one embodiment of the present invention, and FIG. 20B is an overall perspective view of the portable keyboard 100 when the setup part 220 is in a folded-up position according to one embodiment of the present invention.

Figure 20A:
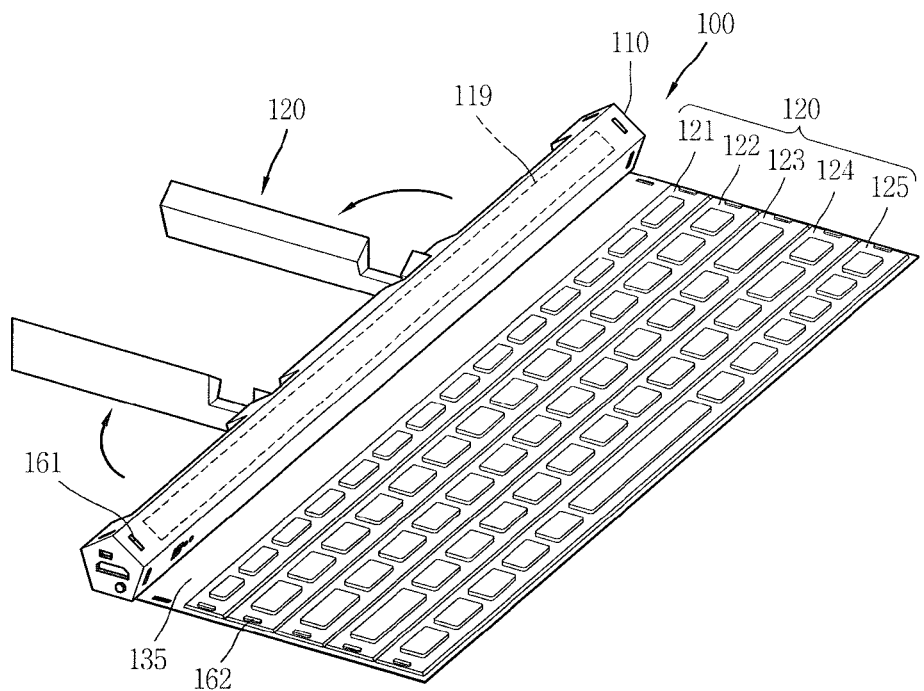
FIG. 20A is an overall perspective view of the portable keyboard when the setup part is in an opened position according to one embodiment of the present invention.
Figure 20B:
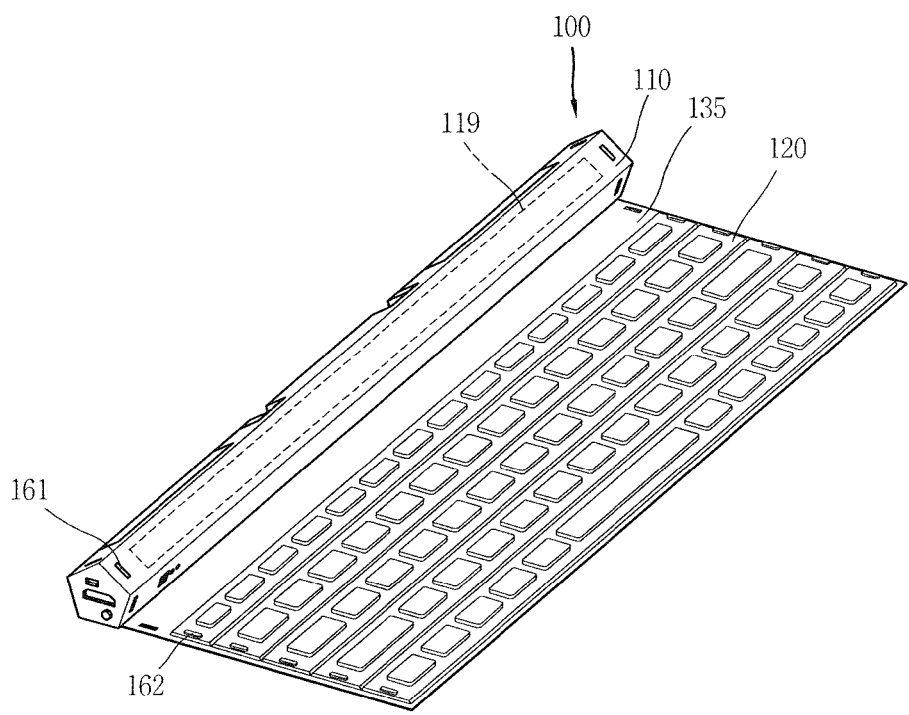
FIG. 20B is an overall perspective view of the portable keyboard when the setup part is in a folded-up position according to one embodiment of the present invention.

Referring to FIGS. 20A and 20B, the portable keyboard 100 according to one embodiment of the present invention includes a main body 110 with an internal battery (not shown) embedded therein, in the shape of a polygonal pillar, a key assembly 120 connected to the main body 110 and having a plurality of key arrangements, and a flexible connecting member 135 connecting the key assembly 120 and the main body 110 and extending to the bottom of the key assembly 120. In this case, slots 161 are formed on each side at two opposite ends of the main body 110, and bosses 162 with a shape corresponding to the slots 161 are provided at two opposite ends of the key assembly 120. The key assembly 120 is rolled up as the bosses 162 are inserted into the slots 161.

The key assembly 120 has a plurality of arrangements, and although FIG. 20A illustrates first to fifth key arrangements 121, 122, 123, 124, and 125, only four key arrangements may be provided if needed.

In one embodiment of the present invention, if the first to fifth key arrangements 121, 122, 123, 124, and 125 are all mechanical, the connecting member 135 includes a front sheet 160, a pattern sheet 170, and a rear sheet 180 as well. Since these sheets are made of thin material, the first key arrangement 121 in the first row of the key assembly 120 can be easily rolled up. That is, the key assembly with keys 126 with a constant height can be seamlessly rolled up by means of the connecting member 135.

Although FIGS. 20A and 20B illustrate that the main body 110 is a pentagonal pillar, the present invention is not limited thereto and the main body 110 may be a rectangular or triangular pillar as in the foregoing embodiment.

The first key arrangement 121 is identical to that of the foregoing embodiment, except that it is mechanical. That is, the main body 110 includes a setup part 220 that can be unfolded outwards where the mobile terminal 200 can be set up. The setup part 220 includes a pair of rotary members 221 and 222.

Figure 21:
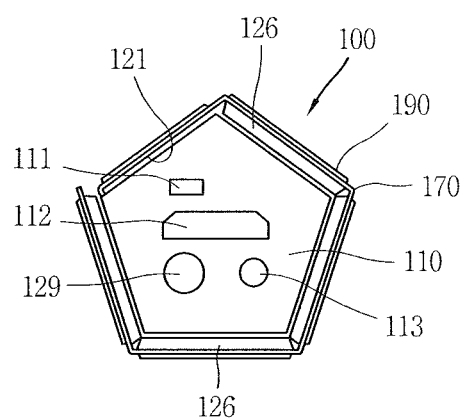
FIG. 21 is a schematic cross-sectional view of the portable keyboard in a rolled-up position according to one embodiment of the present invention.
Figure 22:
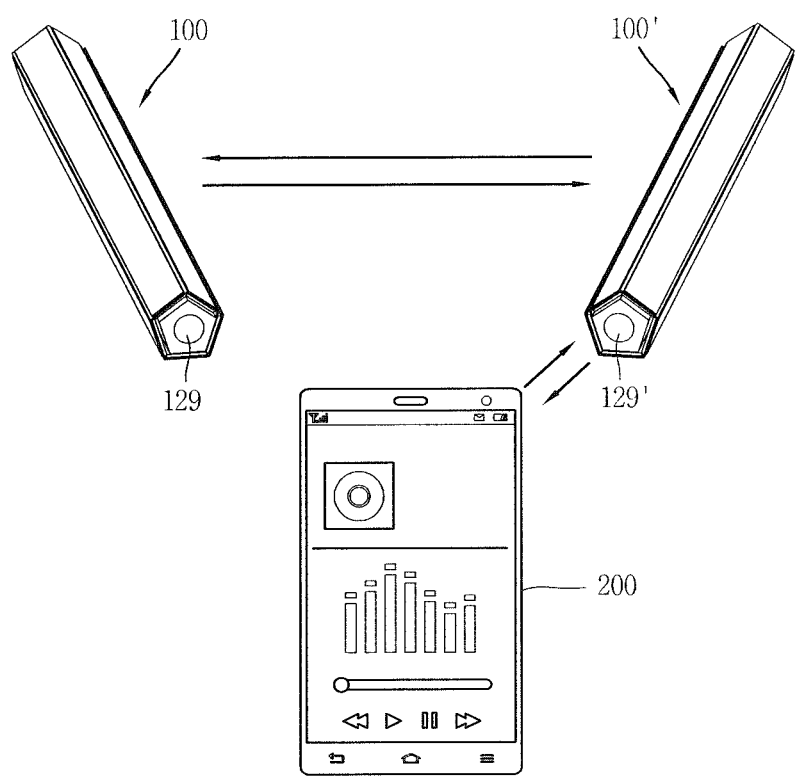
FIG. 22 is a view for explaining a speaker assembly according to one embodiment of the present invention.

FIG. 21 is a schematic cross-sectional view of the portable keyboard in a rolled-up position according to one embodiment of the present invention. Referring to FIG. 21, it can be seen that a power key 111, a charging port 112, a pairing key 113, and a speaker 129 are formed on one side of the main body 110. FIG. 21 illustrates that the first key arrangement 121 is touch-type and the second to fifth key arrangements 122, 123, 124, and 125 are mechanical. FIG. 22 is a view for explaining a speaker assembly according to one embodiment of the present invention. Speakers 129 and 129' are formed on one side of the portable keyboard 100, and stereo sound may be created using the two speakers 129 and 129'.

More specifically, if the user wants to play music on the mobile terminal 200 and listen to it through the portable keyboard 100, sound can be output simultaneously from two portable keyboards 100 and 100' by wirelessly connecting the mobile terminal 200 and the first portable keyboard 100' and wirelessly connecting the first portable keyboard 100' and the second portable keyboard 100, thereby creating stereo sound.

In this case, the mobile terminal 200 is a first source, the first portable keyboard 100' is a first sink and at the same time a second source, and the second portable keyboard 100 is a second sink. The wireless connections may be a Bluetooth wireless connection, for example. The Bluetooth chipset has to forward what it receives signals. This is so-called 'ShareMe' feature. The ShareMe feature provides a low-delay wireless connection from a source to two sink devices simultaneously.

Mobile terminals 200 described in this specification may include Bluetooth-enabled phones, smart phones, laptop computers, digital broadcast terminals, PDAs (personal digital assistants), PMPs (portable multimedia players), E-book readers, navigation devices, etc.

For the wireless connection, A2DP (Advanced Audio Distribution Profile) and AVRCP (Audio/Video Remote Control Profile) protocols may be used.

Meanwhile, when rolling up or opening the portable keyboard 100 according to one embodiment of the present invention, a hall sensor 139 may be used to turn the power on/off depending on whether the key assembly 120 is rolled up or not. For example, the key assembly 120 and the main body 110 may be separated from each other to supply power by opening the key assembly 120, and the power may be automatically turned off by rolling up the key assembly 120. Further, power may be supplied depending on whether the setup part is opened, rather than whether the key assembly 120 is rolled up. That is, power may be supplied when the rotary members 221 and 222 are unfolded, and power supply may be stopped when the rotary members 221 and 222 are folded up.

In case the user wants to supply power depending on whether the key assembly 120 is rolled up, a magnet may be embedded in the fifth key arrangement 125 and a hall sensor 139 may be embedded in the main body 110 so as to detect whether the key assembly 120 is rolled up, by using the magnet and the hall sensor 139. Also, the hall sensor 139 may be embedded in the main body 110 and the magnet 138 may be embedded in the rotary members 221 and 222, so as to detect whether the rotary members 221 and 222 are unfolded, by using the hall sensor 139 and the magnet 138. The positions of the hall sensor 139 and magnet can be inverted.

The above-described portable keyboard is not limited to the configurations and methods according to the above-described embodiments, but instead all or some of the embodiments may be selectively combined so that various modifications can be made.

It will be understood by those skilled in the art that the invention can be implemented in other specific forms without changing the technical spirit or essential features of the invention.

Therefore, it should be understood that the exemplary embodiments described above are not limiting, but only an example in all respects. The scope of the present disclosure is expressed by claims below, not the detailed description, and it should be construed that all changes and modifications achieved from the meanings and scope of claims and equivalent concepts are included in the scope of the present disclosure.

A keyboard that can be rolled up and a keyboard assembly according to embodiments of the present invention are applicable to mobile terminals.

What is claimed is:
1. A portable keyboard comprising:
a key assembly including a plurality of key arrangements each having multiple keys formed in a first direction, the key arrangements formed in a second direction intersecting the first direction;
a polygonal pillar-shaped main body that is formed adjacent to the key assembly;

a flexible connecting member electrically connecting the key assembly and the polygonal pillar-shaped main body;
a magnet provided in at least one of the key arrangements;
a hall sensor that is disposed in the polygonal pillar-shaped main body and detects whether the key assembly is rolled up onto the polygonal pillar-shaped main body; and
a controller that controls the operation of the key assembly,
wherein the controller turns off the portable keyboard in a first state where the key assembly is rolled up around the polygonal pillar-shaped main body, and turns on the portable keyboard in a second state where the key assembly is unrolled from the polygonal pillar-shaped main body,
wherein slots are formed on each side of the polygonal pillar-shaped main body, and bosses corresponding to the slots are formed on the key arrangements, respectively, and the slots and the bosses are coupled in a concavo-convexed manner when the key assembly is rolled up.

2. The portable keyboard of claim 1, further comprising a wireless communication part that makes a pairing connection between the mobile terminal and the portable keyboard.

3. The portable keyboard of claim 2, wherein in case that the key assembly comprises a plurality of hotkeys, different terminals are allocated to the hotkeys, respectively, so that the hotkeys are paired with the corresponding terminals when pressed.

4. The portable keyboard of claim 2, wherein in case that the key assembly comprises a single hotkey, a predetermined order is set up to allocate multiple terminals to the hotkey so that the hotkey is paired with the different terminals in the predetermined order when pressed.

5. The portable keyboard of claim 2, wherein the connecting member comprises a pattern sheet with a dome formed thereon and a front sheet and a rear sheet that are placed on the top and bottom of the pattern sheet and protect the pattern sheet,
the key assembly comprises a key exposed to the top and a key support that is placed underneath the key, supports the key, and has a through-hole to pass the lower end of the key through, and
a first element is provided on the polygonal pillar-shaped main body, a second element is provided under the key, and either one of the first and second elements is a magnet and another is a magnet or steel sheet.

6. The portable keyboard of claim 5, wherein the first element is a magnet, and
the key assembly comprises:
a key exposed to the top side; and
an elastic member that is provided underneath the key and supports the key,
the elastic member being made of steel.

7. The portable keyboard of claim 5, wherein a metal sheet is further provided underneath the rear sheet, and a light source is formed on the pattern sheet so that light leaks around the key.

8. The portable keyboard of claim 5, wherein the first element is covered with a yoke when the first and second elements are magnets.

9. A portable keyboard comprising:
a key assembly including a plurality of key arrangements each having multiple keys formed in a first direction, the key arrangements formed in a second direction intersecting the first direction;
a polygonal pillar-shaped main body that is formed adjacent to the key assembly;
a flexible connecting member the polygonal pillar-shaped main body electrically connecting the key assembly and the polygonal pillar-shaped main body;
a rotary member comprising an end portion fixed at the polygonal pillar-shaped main body and another end portion is opposite from the end portion, the another end portion being extended from the end portion and rotatable around the end portion;
a magnet embedded in the rotary member;
a hall sensor that is disposed in the polygonal pillar-shaped main body and detects whether the rotary member is unfolded; and
a controller that controls the operation of the key assembly,
wherein the rotary member implements a first state where the another end portion of the rotary member is spaced apart from the polygonal pillar-shaped main body by rotating around the end portion and a second state where the another end portion comes into contact with the polygonal pillar-shaped main body, and the controller turns off the portable keyboard in the first state, and turns on the portable keyboard in the second state,
wherein slots are formed on each side of the polygonal pillar-shaped main body, and bosses corresponding to the slots are formed on the key arrangements, respectively, and the slots and the bosses are coupled in a concavo-convexed manner when the key assembly is rolled up.

10. The portable keyboard of claim 9, wherein a pair of rotary members are formed, spaced a predetermined distance from each other.

11. The portable keyboard of claim 10, wherein each of the rotary members has a slot that is formed at a position midway therethrough to insert and fit the polygonal pillar-shaped main body therein in the second state.

12. The portable keyboard of claim 11, further comprising a wireless communication part that makes a pairing connection between the mobile terminal and the portable keyboard.

13. The portable keyboard of claim 12, wherein in case that the key assembly comprises a plurality of hotkeys, different terminals are allocated to the hotkeys, respectively, so that the hotkeys are paired with the corresponding terminals when pressed.

14. The portable keyboard of claim 12, wherein in case that the key assembly comprises a single hotkey, a predetermined order is set up to allocate multiple terminals to the hotkey so that the hotkey is paired with the different terminals in the predetermined order when pressed.

15. The portable keyboard of claim 11, wherein the connecting member comprises a pattern sheet with a dome formed thereon, and a front sheet and a rear sheet that are placed on the top and bottom of the pattern sheet and protect the pattern sheet,
the key assembly comprises a key exposed to the top and a key support that is placed underneath the key, supports the key, and has a through-hole to pass the lower end of the key through, and
a first element is provided on the polygonal pillar-shaped main body, a second element is provided under the key, and either one of the first and second elements is a magnet and another is a magnet or steel sheet.

16. The portable keyboard of claim 9, wherein a first element is provided on the polygonal pillar-shaped main body, a second element is provided under the key, and either one of the first and second elements is a magnet and another is a magnet or steel sheet.

17. The portable keyboard of claim 14, wherein a separation preventing part having a larger diameter than the through-hole is formed at the bottom end of the key.

18. The portable keyboard of claim 11, wherein the polygonal pillar-shaped main body, the key assembly, and the pair of rotary members are on the same plane in the second state.

* * * * *